March 18, 1958      J. C. MINOR      2,827,086
IMPLEMENT FOR UTILIZING BROKEN HACK-SAW BLADES
Filed March 23, 1956
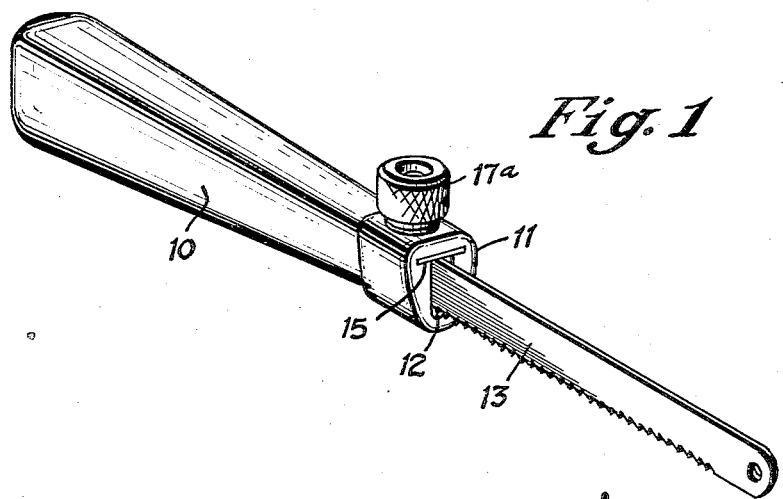
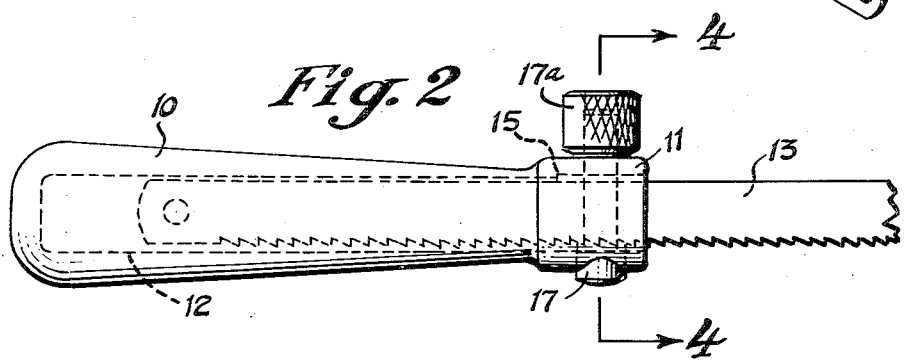
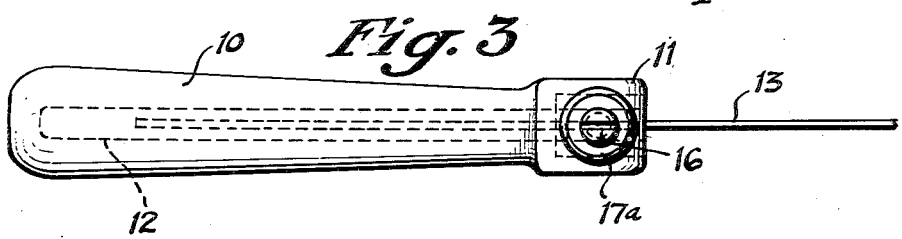
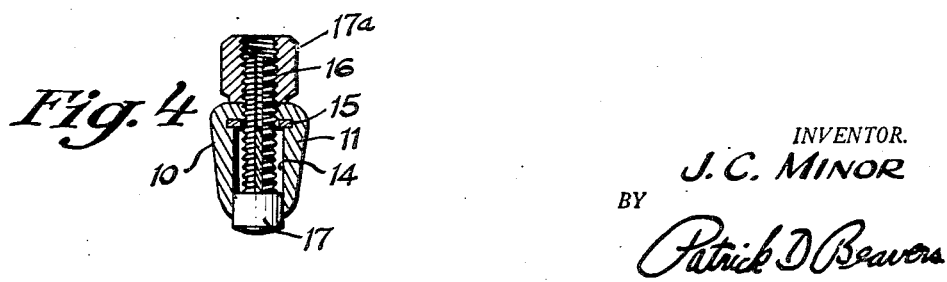
INVENTOR.
J. C. MINOR
BY
Patrick D. Beavers
ATTORNEY _United States Patent Office_ 2,827,086
Patented Mar. 18, 1958

2,827,086

IMPLEMENT FOR UTILIZING BROKEN HACK-SAW BLADES

J. C. Minor, College Park, Ga.

Application March 23, 1956, Serial No. 573,406

1 Claim. (Cl. 145—111)

This invention relates to improvements in saw implements and more particularly to a device capable of utilizing broken hack saw blades.

The principal object of the present invention is to provide a handle for receiving an end portion of a broken hack saw blade and provided with detent means for holding the blade firmly connected to the handle while the ensemble is being used.

Another object of the invention is to provide a handle structure for holding broken hack saw blades, which is of simple construction and capable of being manufactured and retailed at a low monetary figure.

These and various other objects and advantages of the invention will become apparent to the reader of the following description.

In the drawing:

Figure 1 is a perspective view.

Figure 2 is a fragmentary side elevational view.

Figure 3 is a top plan view of the structure shown in Figure 2.

Figure 4 is a cross-section taken on line 4—4 of Figure 2.

Referring to the drawing wherein like numerals designate like parts, it can be seen that numeral 10 denotes an elongated handle, which may be of wood, plastic or some other suitable material and tapered in a manner best suited for a satisfactory hand grip.

The forward portion of the handle is provided with a slightly enlarged formation 11 and through this formation 11 and extending for the major part of the handle 10 is a slot 12 for receiving one end portion of a hack saw blade 13. This may be a broken hack saw blade, such as is normally thrown away.

The formation 11 has an enlarged opening 14 extending from the bottom thereof upwardly to terminate at a plate 15 which is embedded in the formation 11, as shown in Figures 1 and 4.

This plate 15 has an opening therein through which a slotted screw 16 is disposed and the lower end of this screw 16 has a cylindrical head 17 which snugly rides in the opening 14 and serves as a guide.

The slotted screw 16 extends well above the top of the formation 11 and has a knurled nut 17a thereon.

It can be seen that a piece of hack saw blade 13 can be inserted into the formation 11 and through the slot of the screw 16, into the slot 12 and by tightening on the nut 17a, the screw 16 is drawn upwardly so that the blade 13 will be clamped between the head 17 and the embedded plate 14, thus holding the blade firmly while it is used in the usual work of hack sawing.

While the foregoing description sets forth the invention in specific terms, it is to be understood that numerous changes in the shape, size and materials may be resorted to without departing from the spirit and scope of the invention as claimed hereinafter.

Having described the invention what is claimed as new is:

A saw implement comprising a handle having an opening therein, a saw blade for disposition into the opening and detent means on the handle for engaging the saw blade, said detent means comprising a screw disposed transversely through the forward portion of the handle and having a slot for receiving the saw blade, a stop element in the handle at the opening, said screw having one end portion disposed outside of the handle and provided with a nut, which when rotated will draw the screw transversely in the handle to clamp a saw blade in the screw slot between one end of the screw and said stop element, said handle having a transverse opening to accommodate the screw, said screw having a head serving as a guide and snugly slideable in said opening.

References Cited in the file of this patent

UNITED STATES PATENTS

| 216,800 | McNiece | June 24, 1879 |
| 609,967 | Ladd | Aug. 30, 1898 |
| 1,726,241 | Schubert | Aug. 27, 1929 |
| 2,282,902 | Sultan | May 12, 1942 |
| 2,735,463 | Philbrick | Feb. 21, 1956 |

OTHER REFERENCES

Pack: American Machinist, February 4, 1943, page 91.